United States Patent
Cotton et al.

(10) Patent No.: US 12,145,722 B2
(45) Date of Patent: Nov. 19, 2024

(54) CORE MATERIAL FOR BALANCED ROTOR BLADE

(71) Applicant: Sikorsky Aircraft Corporation, Stratford, CT (US)

(72) Inventors: Eric Cotton, Stratford, CT (US); Aaron Daniels, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 18/094,894

(22) Filed: Jan. 9, 2023

(65) Prior Publication Data

US 2023/0227152 A1      Jul. 20, 2023

Related U.S. Application Data

(62) Division of application No. 15/669,591, filed on Aug. 4, 2017, now Pat. No. 11,548,627.

(Continued)

(51) Int. Cl.
*B64C 27/00*      (2006.01)
*B29C 64/386*      (2017.01)
(Continued)

(52) U.S. Cl.
CPC .......... *B64C 27/008* (2013.01); *B29C 64/386* (2017.08); *B33Y 10/00* (2014.12);
(Continued)

(58) Field of Classification Search
CPC .......... B64C 2027/4736; B64C 27/008; B64C 27/473; F01D 5/027; F03D 13/35;
(Continued)

(56) References Cited

U.S. PATENT DOCUMENTS 2,728,479 A    12/1955  Wheeler
2,793,718 A    5/1957   Pajak
(Continued)

FOREIGN PATENT DOCUMENTS

CA    2859329 A1    3/2015
DE    2738895 A1    3/1978
(Continued)

OTHER PUBLICATIONS

Bhate et al., "Analytical, Experimental and Numerical Studies of the Mechanical Behavior of ULTEM-9085 Honeycomb Structures", Phoenix Analysis & Design Technologies, Arizona State University, (2016), (44 pages).

(Continued)

*Primary Examiner* — Grant Moubry
*Assistant Examiner* — Ruben Picon-Feliciano
(74) *Attorney, Agent, or Firm* — Foley & Lardner LLP

(57) ABSTRACT

A method of forming a balanced rotor blade assembly includes measuring a weight of a plurality of sub-components of the rotor blade assembly excluding a core. A configuration of a core of the rotor blade assembly is determined. In combination, the core and the plurality of sub-components achieve a target weight distribution and moment. The core is then fabricated and assembled with the plurality of sub-components to form a rotor blade sub-assembly.

20 Claims, 11 Drawing Sheets

Related U.S. Application Data

(60) Provisional application No. 62/375,087, filed on Aug. 15, 2016.

(51) Int. Cl.

| | | |
|---|---|---|
| *B33Y 10/00* | (2015.01) | |
| *B33Y 50/00* | (2015.01) | |
| *B33Y 80/00* | (2015.01) | |
| *B64C 27/473* | (2006.01) | |
| *F01D 5/02* | (2006.01) | |
| *F03D 1/06* | (2006.01) | |
| *F03D 13/35* | (2016.01) | |
| *F04D 29/66* | (2006.01) | |
| *F16F 15/34* | (2006.01) | |
| *G01M 1/14* | (2006.01) | |
| *G01M 1/36* | (2006.01) | |

(52) U.S. Cl.
CPC ............... *B33Y 50/00* (2014.12); *B33Y 80/00* (2014.12); *B64C 27/473* (2013.01); *F01D 5/027* (2013.01); *F03D 13/35* (2016.05); *F04D 29/662* (2013.01); *F16F 15/34* (2013.01); *G01M 1/14* (2013.01); *G01M 1/36* (2013.01); *B64C 2027/4736* (2013.01); *F03D 1/0675* (2013.01); *F05B 2230/60* (2013.01); *F05D 2250/283* (2013.01); *F05D 2260/15* (2013.01); *F05D 2260/81* (2013.01); *Y02P 70/50* (2015.11); *Y02T 50/60* (2013.01)

(58) Field of Classification Search
CPC .. F03D 1/0675; F04D 29/662; F05B 2230/60; F05D 2250/283; F05D 2260/15; G01M 1/14; G01M 1/36; Y02P 70/523; Y02T 50/673
See application file for complete search history.

(56) References Cited

U.S. PATENT DOCUMENTS

| | | | |
|---|---|---|---|
| 2,814,717 | A | 11/1957 | Hardesty |
| 3,072,225 | A | 1/1963 | Cremer et al. |
| 4,078,422 | A | 3/1978 | Brunsch et al. |
| 4,095,322 | A | 6/1978 | Scarpati et al. |
| 4,968,367 | A | 11/1990 | Diderich et al. |
| 5,475,622 | A | 12/1995 | Reinfelder et al. |
| 8,360,733 | B2 | 1/2013 | Bell et al. |
| 8,851,856 | B2 | 10/2014 | Vertel |
| 8,870,547 | B2 | 10/2014 | Grase et al. |
| 9,217,331 | B1 | 12/2015 | Yellapragada et al. |
| 11,548,627 | B2 * | 1/2023 | Cotton ............... F03D 13/35 |
| 2005/0281999 | A1 | 12/2005 | Hofmann et al. |
| 2009/0252608 | A1 | 10/2009 | Metivier |
| 2011/0209739 | A1 | 9/2011 | Pingree et al. |
| 2013/0000247 | A1 | 1/2013 | Sypeck |
| 2013/0149166 | A1 * | 6/2013 | Schibsbye ............... B29C 70/52 416/241 A |
| 2013/0189086 | A1 | 7/2013 | Bayer et al. |
| 2014/0199175 | A1 | 7/2014 | Godfrey et al. |
| 2014/0341746 | A1 | 11/2014 | Leahy et al. |
| 2014/0377076 | A1 | 12/2014 | Kennedy et al. |
| 2015/0003970 | A1 | 1/2015 | Feldmann et al. |
| 2015/0165724 | A1 | 6/2015 | Cox et al. |
| 2015/0190981 | A1 | 7/2015 | Levit et al. |
| 2016/0375648 | A1 | 12/2016 | Adams et al. |
| 2018/0044002 | A1 | 2/2018 | Cotton et al. |
| 2018/0045174 | A1 | 2/2018 | Yarbrough et al. |
| 2018/0169993 | A1 | 6/2018 | Carstensen et al. |

FOREIGN PATENT DOCUMENTS

| | | |
|---|---|---|
| DE | 10 2012 022 713 B3 | 2/2014 |
| DE | 102012016309 A1 | 2/2014 |
| DE | 102012016309 B | 12/2014 |
| KR | 101376499 B1 | 3/2014 |

OTHER PUBLICATIONS

Extended European Search Report for EP Appl. Ser. No. 16815173.6 dated Mar. 4, 2019 (9 pages).
Extended European Search Report for EP Appl. Ser. No. 17185552.1 dated Feb. 12, 2018 (8 pages).
Final Office Action on U.S. Appl. No. 15/669,591 dated Jan. 27, 2020 (11 pages).
Final Office Action on U.S. Appl. No. 15/669,591 dated Apr. 7, 2022 (12 pages).
Final Office Action on U.S. Appl. No. 15/669,591 dated Aug. 24, 2021 (12 pages).
Foreign Action other than Search Report for EP Appl. Ser. No. 17185552.1 dated Jan. 2, 2019 (6 pages).
International Preliminary Report on Patentability for PCT Appl. Ser. No. PCT/US2016/038654 dated Jan. 4, 2018 (7 pages).
International Search Report and Written Opinion for PCT Appl. Ser. No. PCT/US2016/038654 dated Sep. 7, 2016 (9 pages).
Jones, "Sandwich Composite Production Cost Reduced 52% with Direct Digitial Manufacturing", SSYS-CS-Fortus-Aviradyne, Jul. 2013, Retreived from—http://www.stratasys.com/resources/case-studies/commercial-products/aviradyne (3 pages).
Non-Final Office Action for U.S. Appl. No. 15/580,197 dated Oct. 10, 2019 (8 pages).
Non-Final Office Action on U.S. Appl. No. 15/669,591 dated Jul. 19, 2019 (11 pages).
Non-Final Office Action on U.S. Appl. No. 15/669,591 dated Jun. 26, 2020 (13 pages).
Non-Final Office Action on U.S. Appl. No. 15/669,591 dated Dec. 15, 2021 (12 pages).
Non-Final Office Action on U.S. Appl. No. 17/086,687 dated Oct. 13, 2022 (9 pages).
Notice of Allowance for U.S. Appl. No. 15/580,197 dated Aug. 5, 2020 (7 pages).
Notice of Allowance on U.S. Appl. No. 15/669,591 dated Sep. 9, 2022 (8 pages).
Final Office Action on U.S. Appl. No. 17/086,687 dated Apr. 17, 2023 (9 pages).
Non-Final Office Action on U.S. Appl. No. 17/086,687 dated Oct. 24, 2023 (10 pages).
Notice of Allowance on U.S. Appl. No. 17/086,687 dated Feb. 14, 2024 (8 pages).
Office Action on European Patent Application No. 16815173.6 dated Dec. 6, 2023 (5 pages).

* cited by examiner

CORE MATERIAL FOR BALANCED ROTOR BLADE

CROSS-REFERENCE TO RELATED APPLICATION

This application is a divisional of U.S. application Ser. No. 15/669,591 filed Aug. 4, 2017, which claims the benefit of Provisional Application Ser. No. 62/375,087, filed Aug. 15, 2016, the content of each of which is incorporated herein by reference in its entirety.

BACKGROUND

The subject matter disclosed herein generally relates to rotor blades, and more particularly to a method and apparatus for providing a properly balanced rotor blade.

In order to operate properly in a dynamic environment, the rotor blade on a rotary wing aircraft must be properly balanced to avoid an increased level of vibration. The rotor blades are typically manufactured using a plurality of components. As a result, the weight can vary between what are intended to be identically balanced blades.

In order for the rotor blades to perform properly, the weight distribution and the resultant moments of the blade must meet predetermined criteria which define target distribution and moments along the length or span of the blade from root to tip, and also chordally, from the leading edge to the trailing edge thereof. Achieving the predetermined weight distribution criteria will result in a "balanced" rotor blade that will operate properly for its intended application. Thus, each rotor blade must be individually checked for weight distribution and must be brought into balance. The conventional procedures for balancing a rotor blade assembly are time-consuming.

BRIEF SUMMARY

In one embodiment, a method of forming a balanced rotor blade sub-assembly includes measuring a weight of a plurality of sub-components of the rotor blade assembly excluding a core. A configuration of a core of the rotor blade assembly is determined. In combination, the core and the plurality of sub-components achieve a target weight distribution and moment. The core is then fabricated and assembled with the plurality of sub-components to form a rotor blade sub-assembly.

In addition to one or more of the features described above, or as an alternative, in further embodiments the core is fabricated via an additive manufacturing process.

In addition to one or more of the features described above, or as an alternative, in further embodiments at least one property of the core varies across at least one of a span, chord, and thickness of the rotor blade assembly.

In addition to one or more of the features described above, or as an alternative, in further embodiments the core comprises a core panel including a plurality of cells, each cell including a cell opening bounded by at least one cell wall.

In addition to one or more of the features described above, or as an alternative, in further embodiments determining a configuration of the core further includes determining a weight distribution based of the plurality of sub-components and determining a weight distribution of the core necessary to achieve a target weight distribution and moment of the sub-assembly.

In addition to one or more of the features described above, or as an alternative, in further embodiments determining a configuration of the core further comprises determining at least one of a shape, density, wall thickness, and material of the core.

In addition to one or more of the features described above, or as an alternative, in further embodiments determining a configuration of the core in response to the weight of the plurality of sub-components is performed automatically via an algorithm executed by a processor.

In addition to one or more of the features described above, or as an alternative, in further embodiments anticipated stresses of the rotor blade assembly are provided as an input to the algorithm.

In addition to one or more of the features described above, or as an alternative, in further embodiments structural and dimensional requirements of the core panel are provided as an input to the algorithm.

According to another embodiment, a rotor blade sub-assembly includes a plurality of sub-components and a core. In combination, the core and the plurality of sub-components achieve a target weight distribution and moment such that the rotor blade sub-assembly is balanced.

In addition to one or more of the features described above, or as an alternative, in further embodiments a weight distribution of the core corresponds to a weight distribution of the plurality of sub-components.

In addition to one or more of the features described above, or as an alternative, in further embodiments the rotor blade sub-assembly does not require adhesive to achieve the target weight distribution and moment.

In addition to one or more of the features described above, or as an alternative, in further embodiments the core is formed from a core panel including a plurality of cells, each cell including a cell opening bounded by at least one cell wall.

In addition to one or more of the features described above, or as an alternative, in further embodiments at least one property of the core varies across at least one of a span, chord, and thickness of the rotor blade sub-assembly.

In addition to one or more of the features described above, or as an alternative, in further embodiments the core is formed via an additive manufacturing process.

These and other advantages and features will become more apparent from the following description taken in conjunction with the drawings.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

The detailed description explains embodiments of the present disclosure, together with advantages and features, by way of example with reference to the drawings.

DETAILED DESCRIPTION

Figure 1:
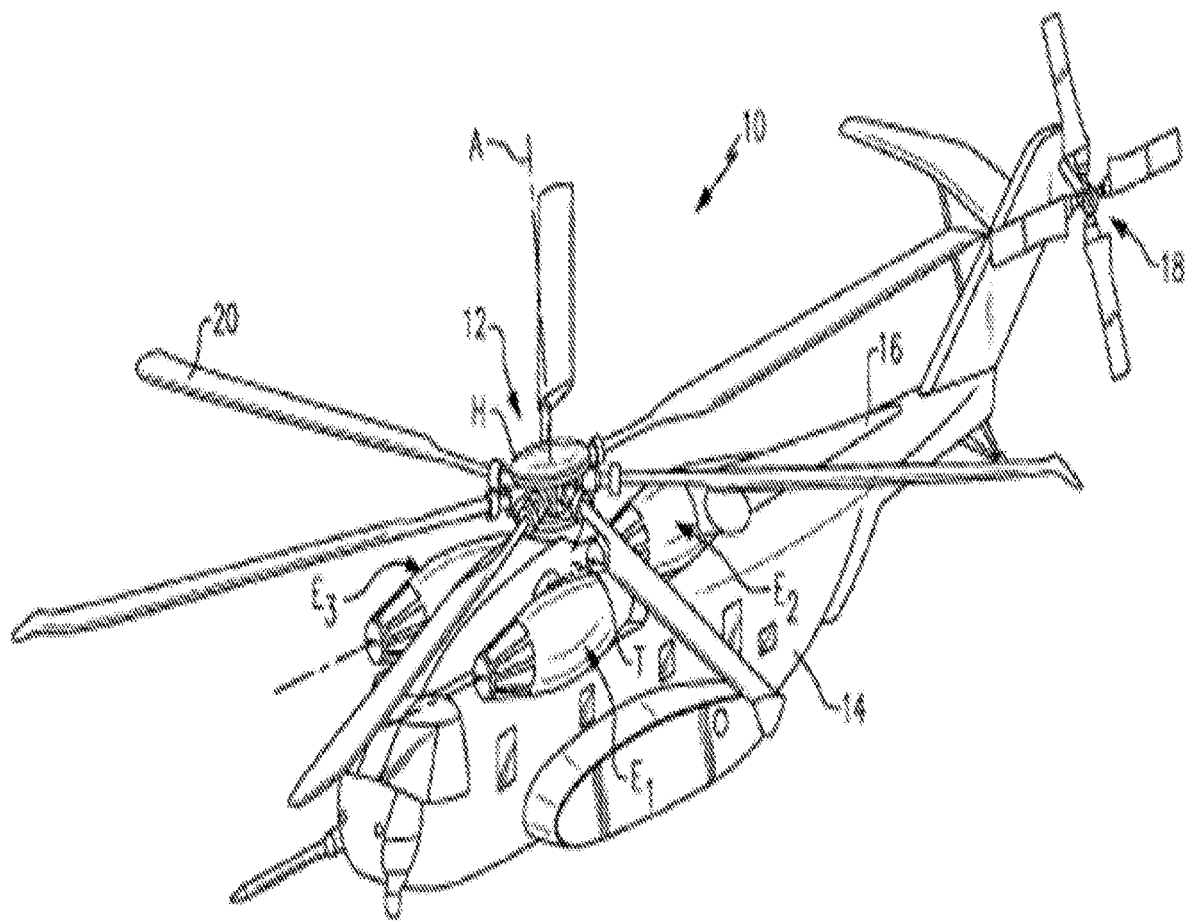
FIG. 1 is a perspective view of an example of a rotary wing aircraft.

FIG. 1 schematically illustrates a rotary-wing aircraft 10 having a main rotor system 12. The aircraft 10 includes an airframe 14 having an extending tail 16 which mounts a tail rotor system 18, such as an anti-torque system. The main rotor system 12 is driven about an axis of rotation A through a main gearbox (illustrated schematically at T) by one or more engines E. The main rotor system 12 includes a plurality of rotor blade assemblies 20 mounted to a rotor hub assembly H. Although a particular helicopter configuration is illustrated and described in the disclosed non-limiting embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

Figure 2:
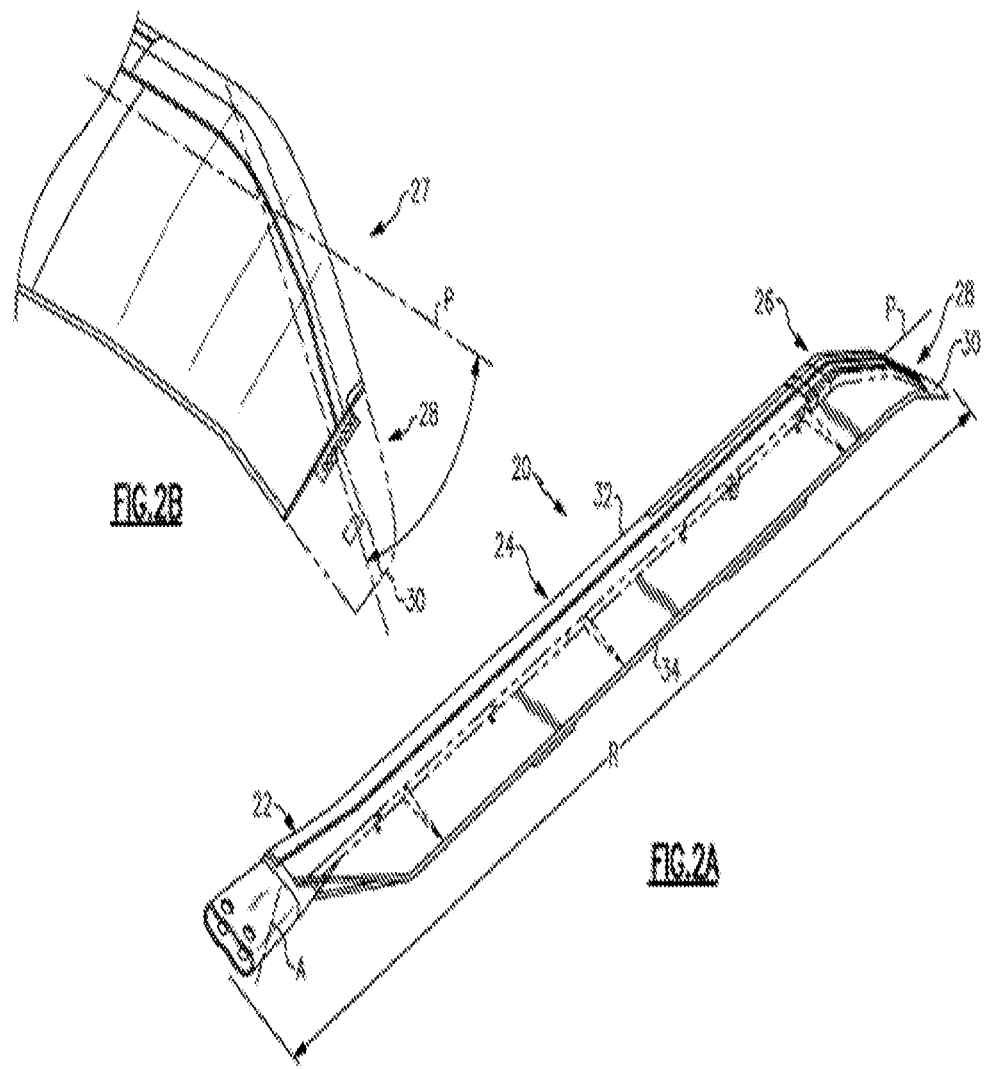
FIGS. 2A and 2B are various perspective views of a main rotor blade of a rotary wing aircraft.

Referring to FIGS. 2A and 2B, each rotor blade assembly 20 of the main rotor system 12 generally includes a root section 22, an intermediate section 24, a tip section 26 and a tip cap 28. Each rotor blade section 22, 24, 26, 28 may define particular airfoil geometries to particularly tailor the rotor blade aerodynamics to the velocity increase along the rotor blade span. The rotor blade tip section 26 is illustrated including an anhedral form 27; however, any angled or non-angled forms such as cathedral, gull, bent, and other non-straight forms will benefit from the present invention. The anhedral form 27 as defined herein may include a rotor blade tip section 26 which is at least partially not contained in a plane defined by the intermediate section 24.

The rotor blade sections define a span R of the main rotor blade assembly 20 between the axis of rotation A and a distal end 30 of the tip cap 28 such that any radial station may be expressed as a percentage in terms of a blade radius x/R. The rotor blade assembly 20 defines a longitudinal feathering axis P between a leading edge 32 and a trailing edge 34. The distance between the leading edge 32 and the trailing edge 34 defines a chord length.

Figure 3:
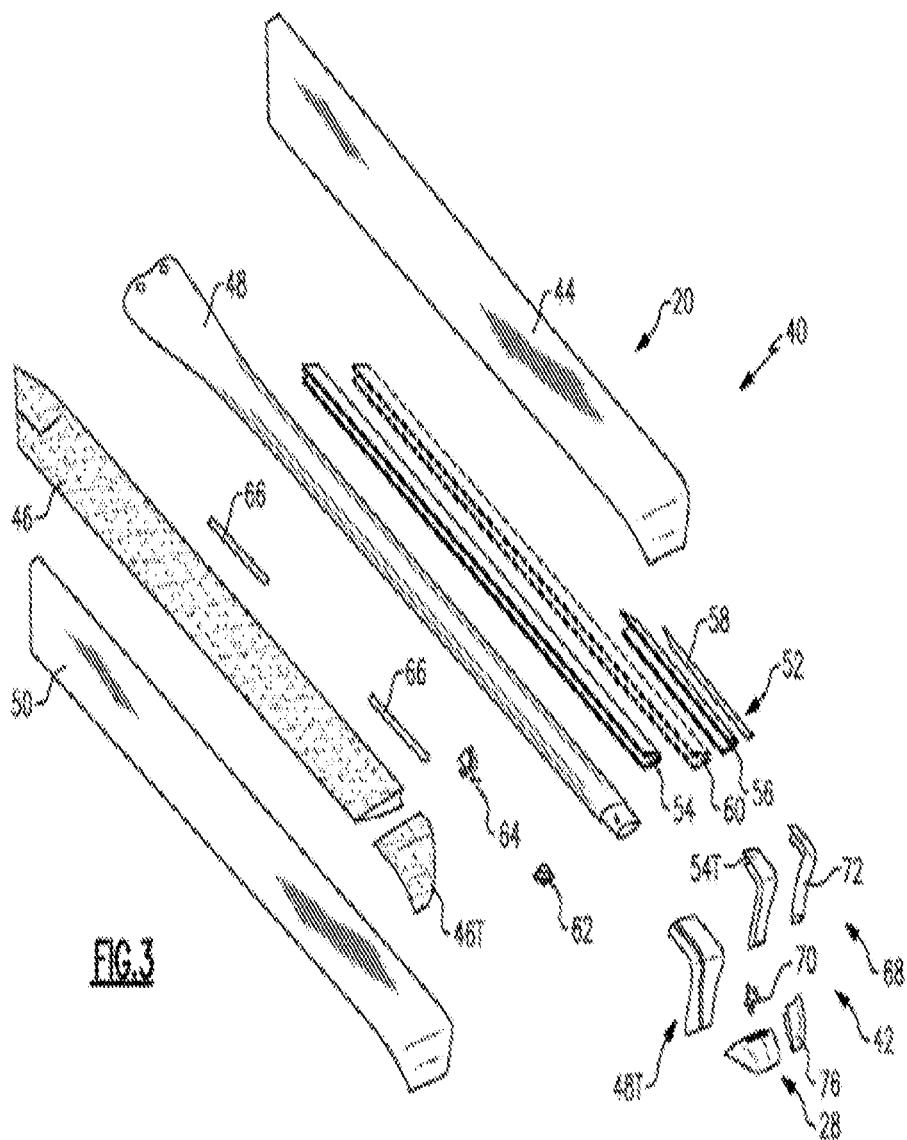
FIG. 3 is an exploded view of a main rotor blade of a rotary wing aircraft.

An example of a rotor blade assembly 20 of a rotary wing aircraft 10 is illustrated in more detail in FIG. 3. The rotor blade assembly 20 generally includes a main blade assembly 40 and a tip assembly 42. The main blade assembly 40 includes an upper skin 44, a main core 46, a main spar 48, a lower skin 50, and a leading edge assembly 52. The leading edge assembly 52 generally includes a main sheath laminate 54 upon which is mounted a wear-resistant material such as a titanium erosion strip 56 and a nickel erosion strip 58 to provide abrasion protection. Alternatively, the sheath laminate 54 may include a single erosion strip 60 manufactured of AM355 which replaces the titanium erosion strip 56 and the nickel erosion strip 58. It should be understood that a variety of a wear-resistant materials may alternatively or additionally be provided for the leading edge assembly 52. Additional structures such as weight cups 62, blade tie down fastener structures 64, and trim tab systems 66 may also be provided.

The tip assembly 42 generally includes a tip spar 48T, a tip core 46T, a tip leading edge assembly 68 and the tip cap 28. The tip cap 28 may be removably attached to the tip spar 48T though hardware 70 in a cap interface to close-out the end of the tip assembly 42. The tip leading edge assembly 68 may also include a splice cap laminate 54T and a tip erosion strip 72 to provide abrasion protection. The tip cap 28 also includes an erosion cap 76. The tip erosion strip 72 and the erosion cap 76 may include AM355, titanium, nickel, or a variety of other wear-resistant materials or combinations thereof. The rotor blade assembly 20 illustrated and described herein is intended as an example only, and it should be understood that other rotor blade constructions are within the scope of the disclosure.

With reference now to FIGS. 4-10, the main core 46 may comprise a core panel 47 as described in PCT/US16/38654, filed on Jun. 22, 2016, the entire contents of which are incorporated herein by reference. The core panel 47 includes a plurality of cells, each cell 80 defined as a cell opening 82 bounded by a cell wall 84. The cell wall 84 extends over the height of the core panel 47, and may be configured to contact an adjacent component, such as the skins 44, 50 of the rotor blade assembly 20. The upper skin 44 and the lower skin 50 may be pre-formed before adhering to the core panel 47, or alternatively, may be formed in the same process as the core panel 47.

Figure 4:
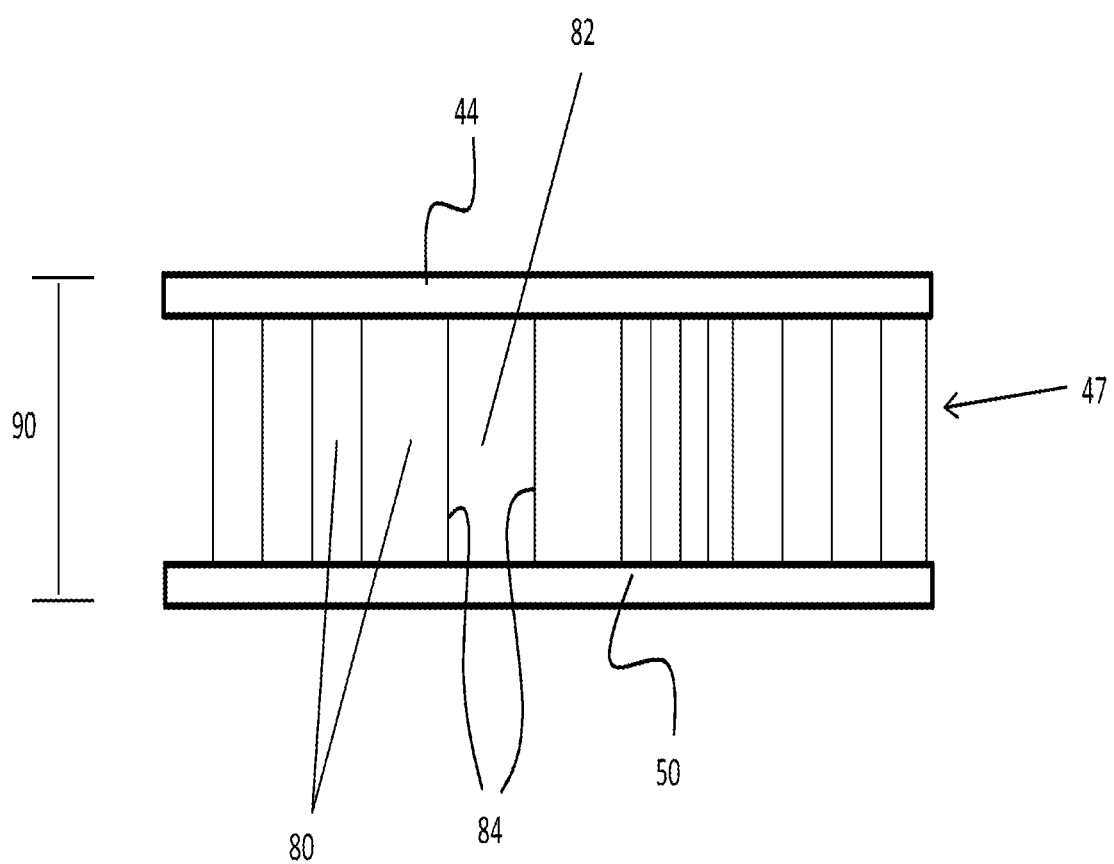
FIG. 4 is a cross-sectional view of a rotor blade taken through a main core according to an embodiment.
Figure 5:
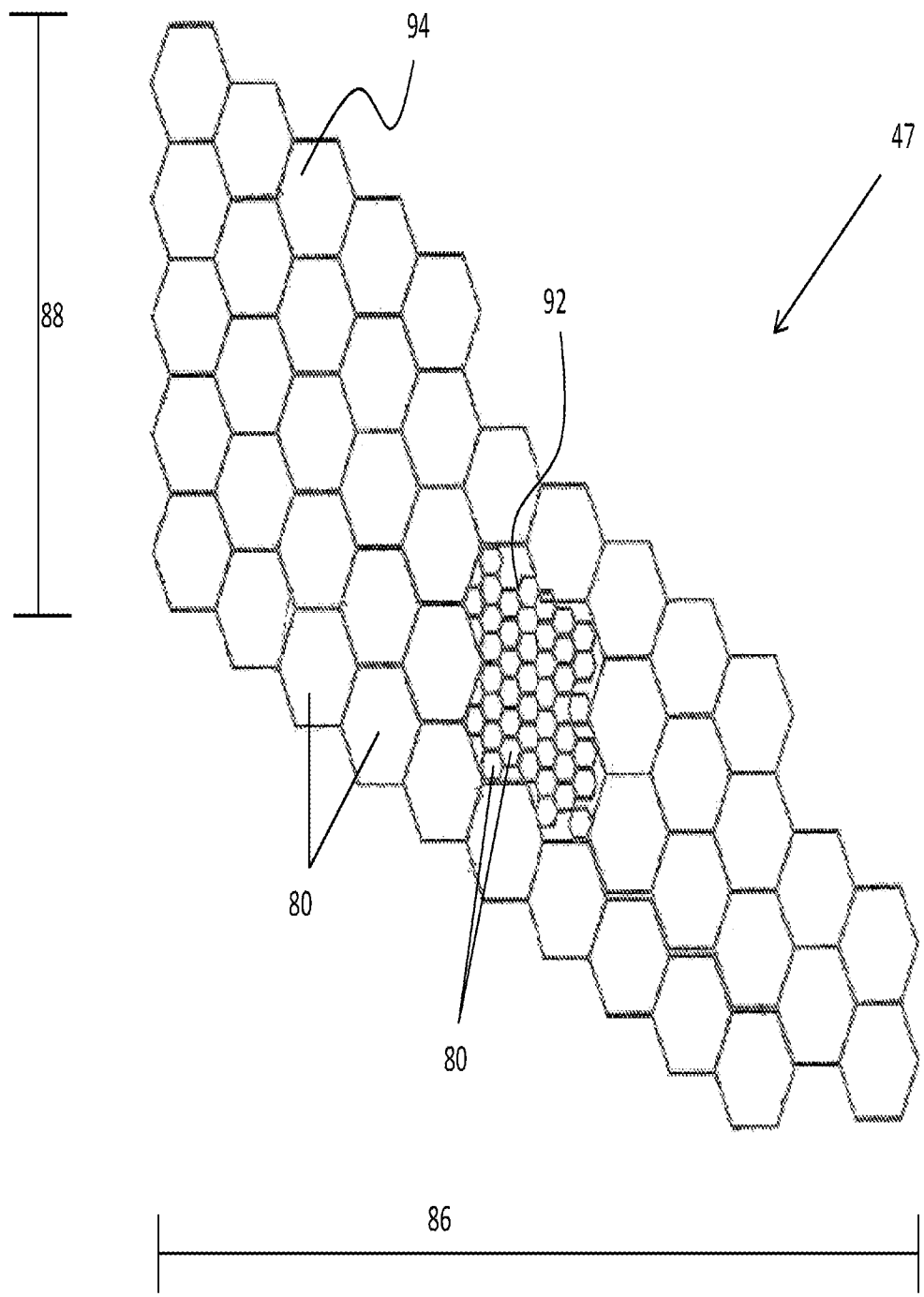
FIG. 5 is a plan view of a core panel with varying core cell sizes and other features according to an embodiment.

The core panel 47 may be formed to have engineered non-uniform properties along at least one of a panel length 86, panel width 88, and/or panel thickness 90 (shown in FIG. 4). In an embodiment, illustrated in FIG. 5, a density of core cells 80 is varied based on the anticipated stresses. In a relatively high stress area 92, the core cells 80 are smaller sized and more tightly packed, while in a relatively low stress area 94, the core cells 80 are larger.

Figure 6:
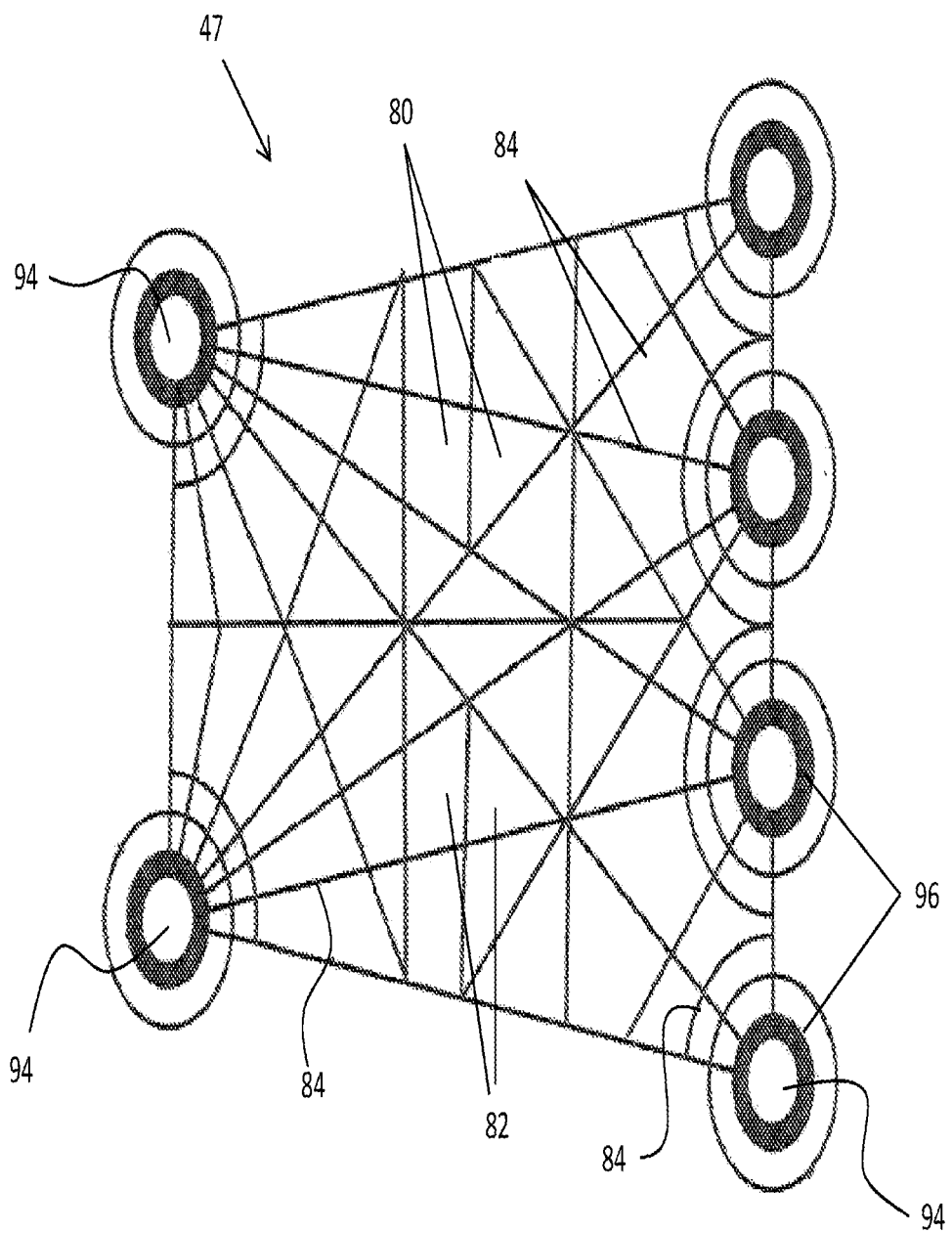
FIG. 6 is a plan view of another core panel according to an embodiment.

In other embodiments, such as shown in FIG. 6, core cell 80 shape and/or orientation is modified based on the stress levels or other requirements of the design. For example, as shown, the core panel 47 may be formed from core cells 80 that are triangular, rectangular, or another polygonal shape. The core cells 80 may vary in size, shape and/or orientation in the panel. In such a structure, cell walls 84 may be oriented to follow an anticipated design load path through the core panel 47. The core panel 47 may include other features such as integrated fastener locations 94 used for later assembly steps. The fastener locations 94 may include a reinforcement zone 96 of substantially solid material around the fastener location 94. Further, the core panel 47 may include curvilinear cell walls 84.

Figure 7:
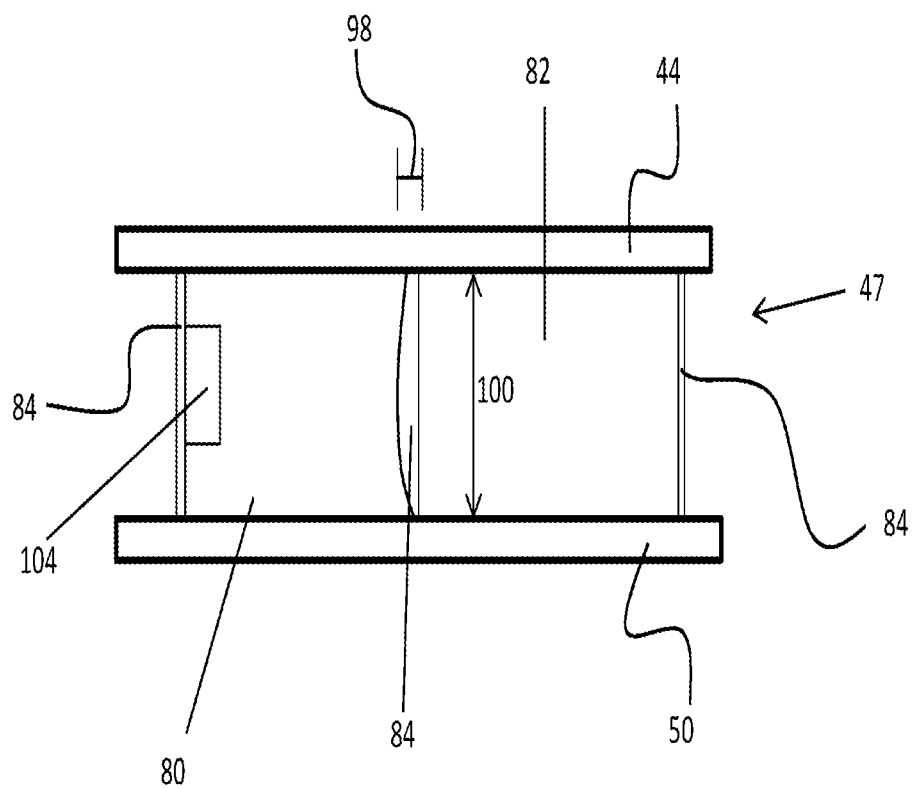
FIG. 7 is a cross-sectional view of another core panel according to an embodiment.
Figure 8:
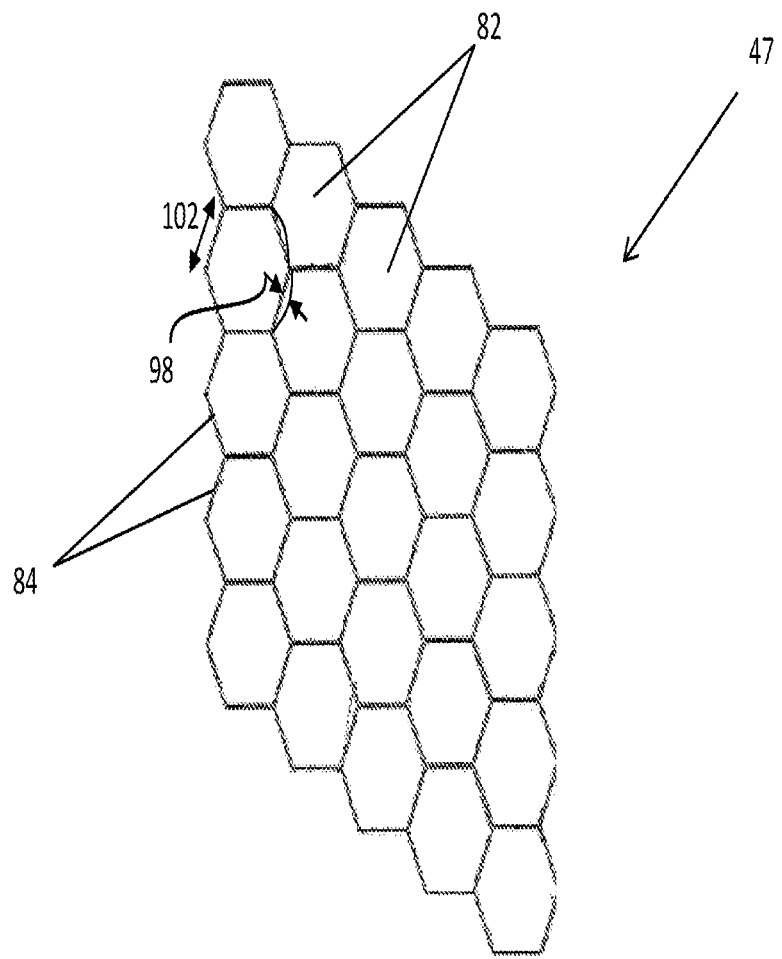
FIG. 8 is a plan view of another core panel according to an embodiment.

Referring to the cross-sectional view of FIG. 7 and the plan view of FIG. 8, in other embodiments, a cell wall thickness 98 is varied along a cell height 100 and/or cell wall length 102, and may include stiffening ribs 104 or other localized features, such as slits or openings. In addition to, or as an alternative to varying cell wall thickness 98, the material used to form the cell wall 84 may be varied. For example, a first material may be used for a first portion of the cell wall 84, while a second material is utilized for a second portion of the cell wall 84, to locally vary selected properties of the core panel 47. Further, referring again to FIG. 5, the core panel 47 may include one or more sections and the material may varied by section. For example, a first core panel portion 92 (shown in FIG. 5) may be formed from a first material, while a second core panel portion 94 (shown in FIG. 5) may be formed from a second material having different selected properties than the first material. As well as providing design flexibility to meet structural load requirements, the materials and configuration of the core panel 47 may be selected to locally vary conductivity, such as electrical or thermal conductivity, or to locally tune vibration damping or other properties of the core panel 47.

Figure 9:
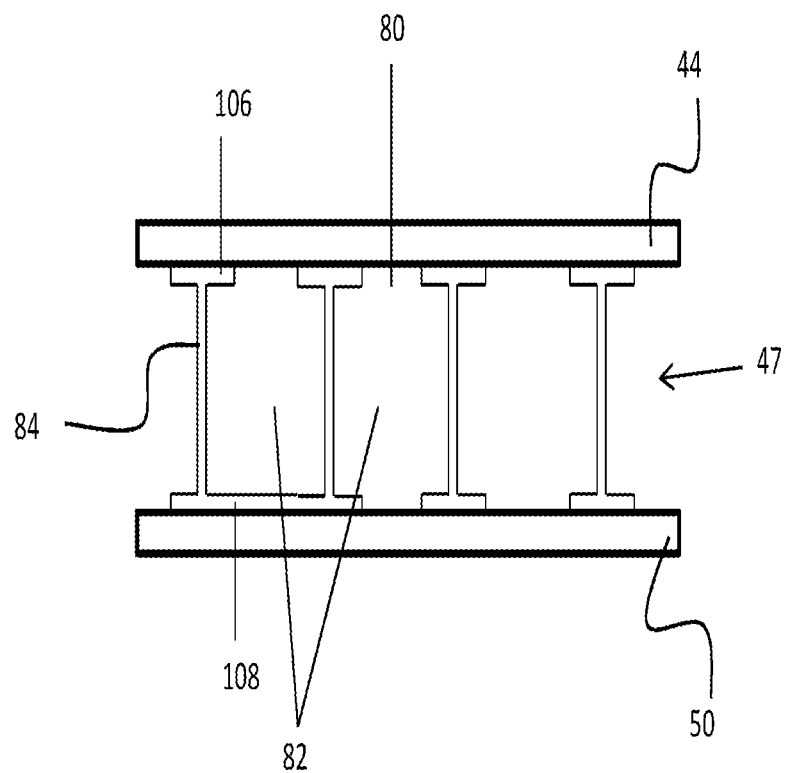
FIG. 9 is a cross-sectional view of another core panel according to an embodiment.
Figure 10:
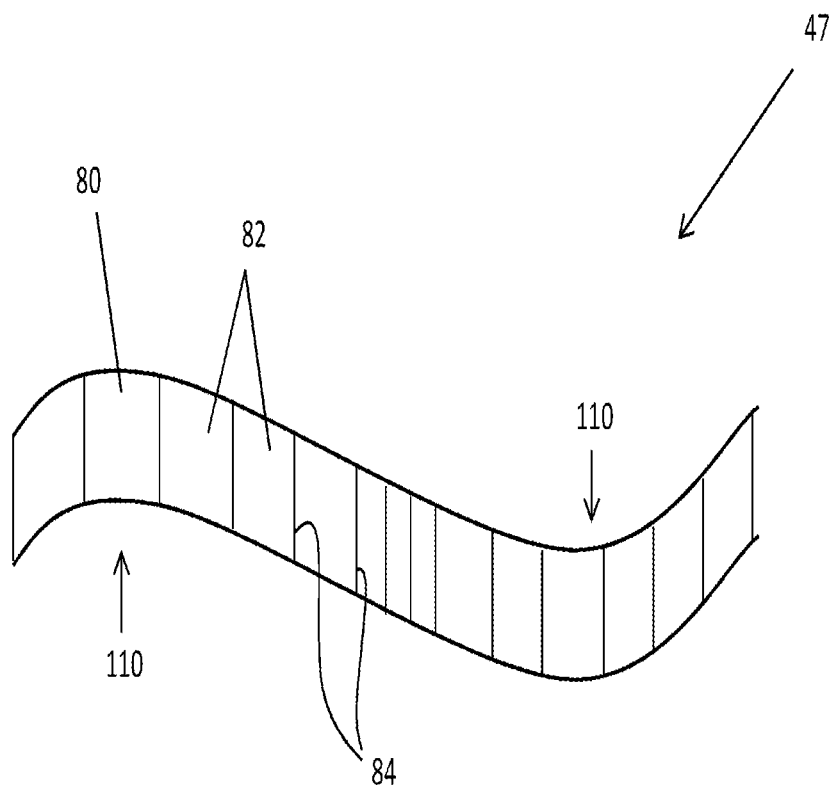
FIG. 10 is an end view of yet another core panel according to an embodiment.

In another embodiment, shown in FIG. 9, the core panel 47 is formed with an end flange 106 at some of the core cells 80 to increase surface area for adhesion to the first skin 44 and/or second skin 50. Additionally, in some embodiments, the core panel 47 may be formed with a closed cell end 108 at one or more ends of the core cell 80. In other embodiments, as shown in FIG. 10, the core panel 47 is formed with one or more radius of curvature 110 to form a contoured sandwich panel (not shown)

It is to be appreciated that while for clarity of the description and drawings, the core cell 47 modifications or non-uniformities are presented separately, one skilled in the art will readily recognize that the non-uniformities shown in FIGS. 4-10 may be combined in design of the core panel 47.

During the manufacture of a conventional rotor blade assembly, at least a portion of the sub-components of the assembly is weighed. As the sub-components are connected to one another, adhesive is added to one or more portions of the assembly. The adhesive is intended to add weight to the assembly where needed such that the weight distribution and the resultant moments of the rotor blade assembly meet the predetermined criteria necessary for the rotor blade to be considered "balanced."

Figure 11:
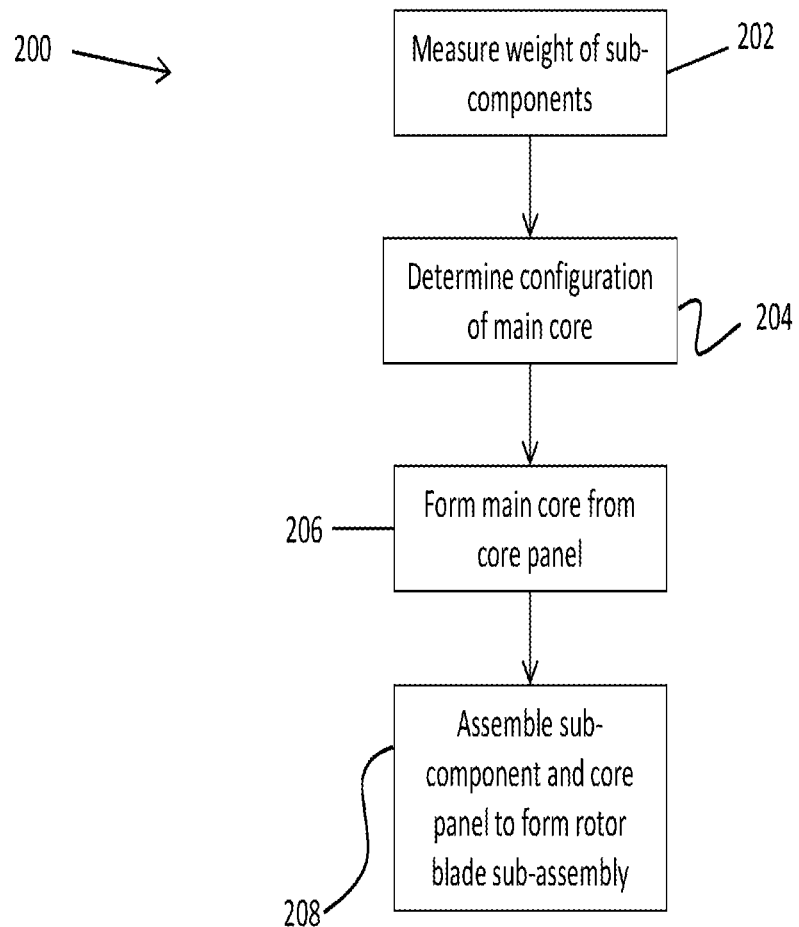
FIG. 11 is a schematic diagram of a method of manufacturing a balanced rotor blade assembly.

A method 200 of forming a balanced rotor blade assembly 20 is illustrated in FIG. 11. As shown in block 202, the method includes measuring a weight of one or more of a plurality of sub-components of a blade assembly 20, excluding the core panel 47. In response to the measured weights, a configuration of the core panel 47 intended for use in the rotor blade assembly 20 is determined, see block 204. The core panel 47 is then fabricated, shown in block 206, and connected to one or more of the plurality of weighed sub-components to form a sub-assembly of the rotor blade 20, as shown in block 208. Further, additional components or sub-components that were not weighed, such as a tip cap for example, may be included in the formation of the sub-assembly. After formation of the sub-assembly, additional sub-components are added to the sub-assembly to form a rotor blade assembly 20.

The configuration of the core panel 47 is customized in view of the weight distribution of the other sub-components such that when the rotor blade is fully assembled, the assembly 20 has a desired weight distribution and moment. As a result, the need to include adhesive at various portions of the assembly to achieve a "balanced" rotor blade assembly 20 is eliminated.

In an embodiment, an algorithm may be used to determine an optimized configuration of the core panel 47 in view of one or more inputs. The algorithm may be implemented through any suitable means, such as for example, in a computing environment with a processor such as a CPU. The inputs provided to the algorithm may include the structural and dimensional requirements of the core panel 47 and also the weight distribution of the sub-components of the rotor blade assembly excluding the core panel 47. Accordingly, the algorithm is configured to determine a corresponding weight distribution of the core panel 47 necessary to achieve a target weight distribution and moment to achieve a balanced rotor blade. In view of the required weight distribution of the core panel 47, and in further view of the stresses at each region of the rotor blade assembly 20, a cell structure 80, including shape, density, and material, is determined for the entire core panel 47. In an embodiment, the algorithm is configured to perform a finite element analysis or use other design and analysis tools. Accordingly, the design configuration of the core panel 47 may be modified or iterated until the plurality of requirements associated with the core panel 47 are met.

Once the design of the core panel 47 has been established, the core panel 47 is manufactured by one or more manufacturing methods based on the material utilized and/or the desired structure of the core panel 47. These manufacturing methods may include additive manufacturing methods such as material deposition, 3-D printing, laser sintering, or the like. Such manufacturing processes allow for the formation of a unitary core panel 47 having locally varied properties and dimensional features as described above. Additive manufacturing methods used in formation of the core panel 47 provide a high degree of flexibility in fabrication options enabling local optimization.

It should be understood that although the method of forming a balanced rotor blade assembly is illustrated and described with respect to a main rotor blade assembly, blades of a tail rotor assembly or thrust generation system are also contemplated herein. In addition, the method of forming a rotor blade described herein may be used in numerous applications, including but not limited to rotary wing aircraft, fixed wing aircraft, turbines, wind mills, and marine propellers for example.

A core panel 47 as described herein may be engineered with non-uniform properties to achieve the precise mechanical properties required by design. Those properties can be tailored to continuously change across one or more of the span, chord, and thickness of the rotor blade. In an embodiment, the core panel may be customized based on the weight of the other sub-components of a rotor blade assembly to form a rotor blade assembly with a balanced weight and moment. As a result, the dynamic balancing of the rotor blade assembly 20 may be improved, or alternatively, eliminated.

While the present disclosure has been described in detail in connection with only a limited number of embodiments, it should be readily understood that the present disclosure is not limited to such disclosed embodiments. Further, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A rotor blade sub-assembly comprising:
   a plurality of sub-components; and
   a core, wherein in combination, the core and the plurality of sub-components achieve a target weight distribution and moment such that the rotor blade sub-assembly is balanced,
   wherein the core comprises a plurality of cells and an interior of each of the plurality of cells extends between an upper skin and a lower skin; and
   wherein the balanced sub-assembly of a rotor blade assembly is manufactured by:
      measuring a weight of the plurality of sub-components of the rotor blade assembly excluding a core;

determining, by a processor, responsive to the measured weight of the plurality of sub-components of the rotor blade assembly excluding the core, a configuration of the plurality of cells, based on a weight distribution of the plurality of sub-components, the plurality of cells including a first plurality of cells having a first density creating a first weight in a first area of the core and including a second plurality of cells having a second density creating a second weight in a second area of the core to form the core such that, in combination, the core having the first weight in the first area and the second weight in the second area and the plurality of sub-components achieve the target weight distribution and moment for the rotor blade assembly, each cell including a cell opening bounded by at least one cell wall, wherein the cell opening extends between the upper skin and the lower skin, and wherein the at least one cell wall is substantially perpendicular to the upper skin and to the lower skin;

determining, by the processor, a first anticipated stress in the first area and a second anticipated stress in the second area, the second anticipated stress being lower than the first anticipated stress;

fabricating, via an additive manufacturing process, the core based at least in part on the configuration of the plurality of cells determined by the processor and the first anticipated stress and the second anticipated stress determined by the processor, wherein (1) the second density is lower than the first density and (2) the core is a unitary core; and assembling the plurality of sub-components and the core to form the rotor blade sub-assembly having the target weight distribution and moment for the rotor blade assembly.

2. The rotor blade sub-assembly according to claim 1, wherein a weight distribution of the core corresponds to a weight distribution of the plurality of sub-components.

3. The rotor blade sub-assembly according to claim 1, wherein the rotor blade sub-assembly does not require adhesive to achieve the target weight distribution and moment.

4. The rotor blade sub-assembly according to claim 1, wherein the core is formed from a core panel including the plurality of cells.

5. The rotor blade sub-assembly according to claim 1, wherein at least one property of the core varies across at least one of a span, a chord, or a thickness of the rotor blade sub-assembly.

6. A rotor blade sub-assembly comprising:
a plurality of sub-components; and
a core, wherein in combination, the core and the plurality of sub-components achieve a target weight distribution and moment such that the rotor blade sub-assembly is balanced,
wherein the core comprises a plurality of cells and an interior of each of the plurality of cells extends between an upper skin and a lower skin;
wherein each cell of the plurality of cells includes a cell opening bounded by at least one cell wall;
wherein the cell opening extends between the upper skin and the lower skin;
wherein the at least one cell wall is substantially perpendicular to the upper skin and to the lower skin;
wherein the balanced sub-assembly of a rotor blade assembly is manufactured in accordance with a determination of a first anticipated stress in a first area of the core and a second anticipated stress in a second area of the core, the second anticipated stress being lower than the first anticipated stress; and wherein the core is constructed of a plurality of layers fabricated via an additive manufacturing process, the core being fabricated based at least in part on the first anticipated stress and the second anticipated stress, wherein the core is a unitary core.

7. The rotor blade sub-assembly according to claim 6, wherein the balanced sub-assembly of the rotor blade assembly is manufactured by assembling the plurality of sub-components and the core to form the rotor blade sub-assembly having the target weight distribution and moment for the rotor blade assembly.

8. The rotor blade sub-assembly according to claim 6, wherein the balanced sub-assembly of the rotor blade assembly is manufactured by measuring a weight of the plurality of sub-components of the rotor blade assembly excluding the core.

9. The rotor blade sub-assembly according to claim 6, wherein the balanced sub-assembly of the rotor blade assembly is manufactured based on a measured weight of the plurality of sub-components of the rotor blade assembly excluding the core, a configuration of the plurality of cells.

10. The rotor blade sub-assembly according to claim 6, wherein the balanced sub-assembly of the rotor blade assembly is manufactured based on a determination of a weight distribution of the plurality of sub-components.

11. The rotor blade sub-assembly according to claim 6, wherein the balanced sub-assembly of the rotor blade assembly is manufactured based on a configuration of the plurality of cells, the plurality of cells including a first plurality of cells having a first density creating a first weight in the first area of the core and including a second plurality of cells having a second density creating a second weight in the second area of the core to form the core such that, in combination, the core having the first weight in the first area and the second weight in the second area and the plurality of sub-components achieve the target weight distribution and moment for the rotor blade assembly.

12. The rotor blade sub-assembly according to claim 6, wherein the balanced sub-assembly of the rotor blade assembly is manufactured based on a configuration of the plurality of cells, the plurality of cells including a first plurality of cells having a first density creating a first weight in the first area of the core and including a second plurality of cells having a second density lower than the first density and creating a second weight in the second area of the core to form the core.

13. The rotor blade sub-assembly according to claim 6, wherein the balanced sub-assembly of the rotor blade assembly is manufactured based on a configuration of the plurality of cells, each cell of the plurality of cells including a cell opening bounded by the at least one cell wall.

14. The rotor blade sub-assembly according to claim 6, wherein the target weight distribution of the core corresponds to a weight distribution of the plurality of sub-components.

15. The rotor blade sub-assembly according to claim 6, wherein the rotor blade sub-assembly does not require adhesive to achieve the target weight distribution and moment.

16. The rotor blade sub-assembly according to claim 6, wherein the core is formed from a core panel including the plurality of cells, each cell including a cell opening bounded by the at least one cell wall.

17. The rotor blade sub-assembly according to claim 6, wherein at least one property of the core varies across at least one of a span, a chord, or a thickness of the rotor blade sub-assembly.

18. The rotor blade sub-assembly according to claim 6, wherein the core comprises a core panel.

19. The rotor blade sub-assembly according to claim 6, wherein the balanced sub-assembly of the rotor blade assembly is manufactured according to a determination of a configuration of the core such that, in combination, the core and the plurality of sub-components achieve the target weight distribution and moment.

20. The rotor blade sub-assembly according to claim 19, wherein the configuration of the core is based on at least one of a shape, a density, a wall thickness, or material of the core.

* * * * *